Jan. 12, 1926.

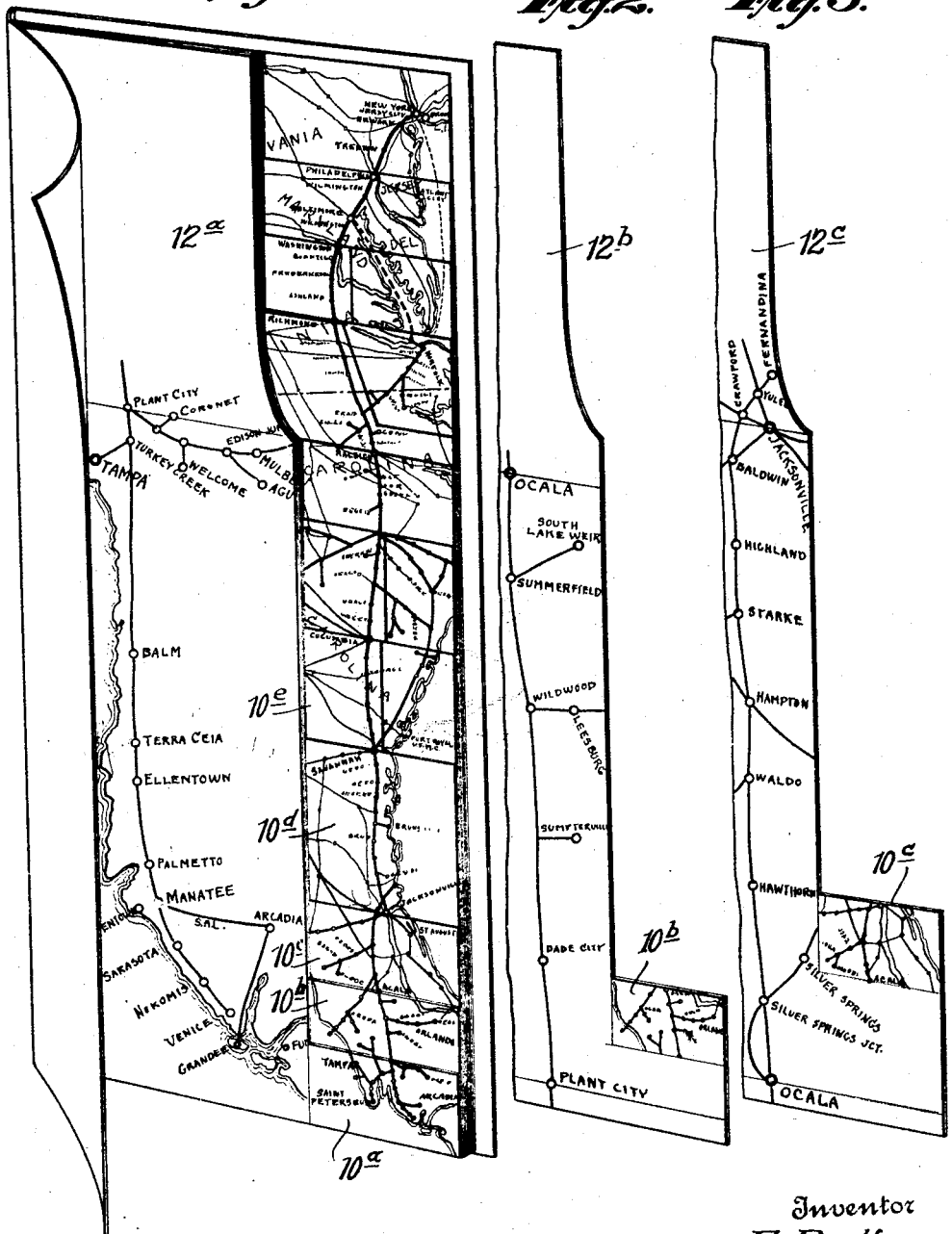

R. E. PARKER

BOOK INDEX

Filed August 7, 1925   2 Sheets-Sheet 2

1,569,390

Inventor
Ralph E. Parker.
By His Attorney

Patented Jan. 12, 1926.

1,569,390

UNITED STATES PATENT OFFICE.

RALPH EGBERT PARKER, OF BIRMINGHAM, ALABAMA.

BOOK INDEX.

Application filed August 7, 1925. Serial No. 48,809.

*To all whom it may concern:*

Be it known that I, RALPH EGBERT PARKER, a citizen of the United States, and resident of Birmingham, Jefferson County, and State of Alabama, have invented certain new and useful Improvements in Book Indexes, of which the following is a specification.

The invention relates to an improved index for books and is adapted to show at a glance where different parts of a lay-out can be found illustrated at a comparatively large scale and in quite complete detail.

While not limited thereto, my improved index is particularly useful for showing where large scale illustrations of a map or parts of a machine may be found.

The invention will be understood from the following specification when read in connection with the accompanying drawings in which Fig. 1 is a view of a book having pages and index portions embodying my invention;

Figs. 2 and 3 are separate details of the two pages illustrated in Fig. 1;

Referring in detail to the drawings, numerals $10^a$, $10^b$, $10^c$, etc. represent index portions of pages $12^a$, $12^b$, $12^c$, etc. The several index portions $10^a$, $10^b$, $10^c$, etc., collectively show a complete lay-out such, for example, as a geographical sub-division of a map. Each of the pages $12^a$, $12^b$, $12^c$, etc, has delineated thereon at a much larger scale a representation of the territory or part shown in the corresponding index portion $10^a$, $10^b$, $10^c$, etc.

The index portions or tabs form thumb indexes and the various pages $12^a$, $12^b$, $12^c$, etc. are so collated that when the book or pamphlet is bound, the several index tabs will collectively show a complete lay-out at a comparatively small scale. Each of the pages will contain a large scale representation of the portion shown on the index tab. For example, where the map is used as an automobile road map, different turns in the road can be clearly marked and other data can be indicated which will be helpful to motorists or others using the map.

Figure 4:
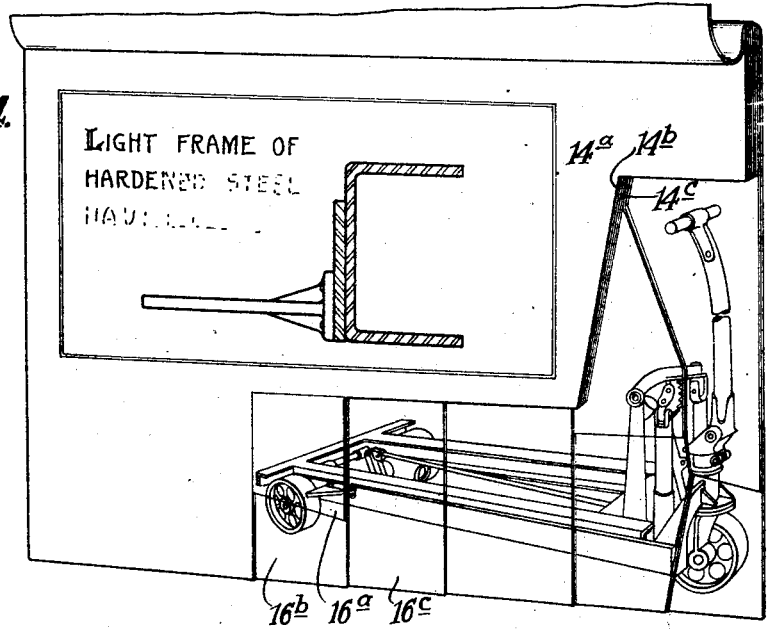
Fig. 4 is a view illustrating the invention applied to a catalogue.

Fig. 4 illustrates a catalogue in which the various pages $14^a$, $14^b$, $14^c$, etc. are each provided with an index portion $16^a$, $16^b$, $16^c$, etc. these index portions collectively show the lay-out or assembled view, for example, of a machine. On each of the pages will be shown a large scale view of the portion corresponding to that illustrated on the index tab. Such pages will also have printed thereon either directions or descriptive matter pertaining to the particular part indicated.

Figure 5:
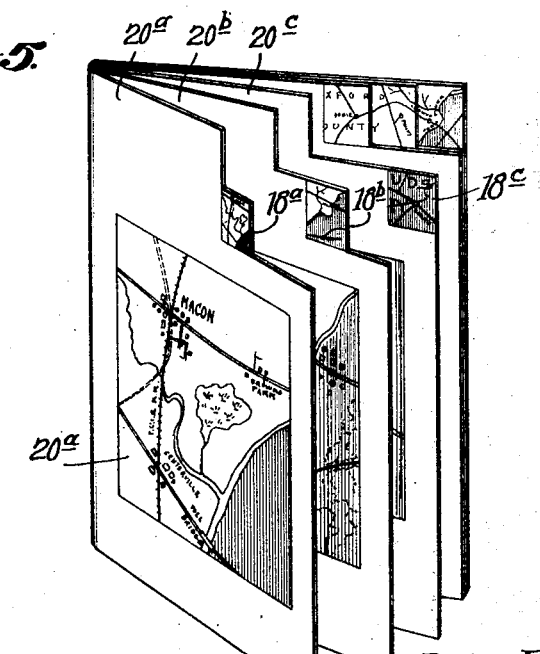
Fig. 5 illustrates a modification in which the map index is contained in one corner of the book.

Fig. 5 illustrates a slightly modified embodiment of the invention in which index portions $18^a$, $18^b$, $18^c$, etc. are contained in one corner of the book and each of the pages $20^a$, $20^b$, $20^c$, etc. will contain a large scale representation of that part indicated on the index portion.

While I have described the invention as applied to maps or catalogues, it is to be understood that I am not limited thereto as it can be readily adapted to other uses. The term "lay-out" used in the claims is intended to cover any graphic representation. It will be apparent that the invention is applicable as an index for locating different parts or detail drawings at a large scale corresponding to parts which are shown collectively on an assembly drawing which is formed in different sub-divisions on the index tabs.

What I claim is:—

1. A book having pages shaped to form index tabs which collectively expose to view a complete lay-out, each page of said book showing in greater detail the part of the lay-out shown on its index tab.

2. A book having pages each with cut out portions to expose part of the page below, said pages being assembled to collectively expose a diagram at a comparatively small scale and each page having a larger scale representation thereon of the part shown in said diagram.

3. A map in book form having pages shaped to expose index portions on which are delineated separate parts of the map, each page having a large scale representation corresponding to the part of the map shown in its index portion.

In witness whereof, I have hereunto signed my name.

RALPH EGBERT PARKER.